(12) United States Patent
Morimoto

(10) Patent No.: US 8,366,989 B2
(45) Date of Patent: Feb. 5, 2013

(54) METHOD FOR PRODUCING POROUS HONEYCOMB STRUCTURE AND POROUS HONEYCOMB STRUCTURE

(75) Inventor: Kenji Morimoto, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 874 days.

(21) Appl. No.: 11/578,947

(22) PCT Filed: Apr. 21, 2005

(86) PCT No.: PCT/JP2005/007605
§ 371 (c)(1), (2), (4) Date: Dec. 12, 2006

(87) PCT Pub. No.: WO2005/102963
PCT Pub. Date: Nov. 3, 2005

(65) Prior Publication Data
US 2007/0241484 A1    Oct. 18, 2007

(30) Foreign Application Priority Data
Apr. 22, 2004   (JP) .................. 2004-126264

(51) Int. Cl.
*C04B 33/32*   (2006.01)
(52) U.S. Cl. ........................................ 264/630
(58) Field of Classification Search .................. 264/630, 264/631
See application file for complete search history.

(56) References Cited

U.S. PATENT DOCUMENTS

| | | | |
|---|---|---|---|
| 4,385,135 A | 5/1983 | Langer et al. | |
| 5,252,272 A | 10/1993 | Yavuz et al. | |
| 5,507,980 A * | 4/1996 | Kelkar et al. | 264/15 |
| 5,538,681 A | 7/1996 | Wu | |
| 6,254,822 B1 | 7/2001 | Brundage | |
| 6,669,751 B1 | 12/2003 | Ohno et al. | |
| 6,840,976 B2 | 1/2005 | Vance et al. | |
| 7,052,532 B1 * | 5/2006 | Liu et al. | 96/154 |
| 7,473,464 B2 * | 1/2009 | Morimoto et al. | 428/305.5 |

(Continued)

FOREIGN PATENT DOCUMENTS

| | | |
|---|---|---|
| JP | A 58-213691 | 12/1983 |
| JP | A 61-168582 | 7/1986 |

(Continued)

OTHER PUBLICATIONS

Norton, F.H. Elements of Ceramics. Reading, MA, Addison-Wesley, 1970. p. 15-17 and 48.*

(Continued)

*Primary Examiner* — Matthew Daniels
*Assistant Examiner* — Erin Snelting
(74) *Attorney, Agent, or Firm* — Oliff & Berridge PLC

(57) ABSTRACT

The method for producing a porous honeycomb structural body according to the present invention is the method, which comprises preparing a green body by kneading a forming material containing a main constituent material consisting of non-oxide ceramics and/or a metal and an organic binder, manufacturing a honeycomb shaped formed body (honeycomb formed body) by shaping and drying said green body, calcining the honeycomb formed body to obtain a calcined body, and firing finally the calcined body to obtain a porous honeycomb structural body, wherein said forming material further includes 0.01-10 parts by mass of an inorganic layer material to 100 parts by mass of said main constituent material, in addition to said main constituent material and said organic binder.

23 Claims, 1 Drawing Sheet

U.S. PATENT DOCUMENTS

| | | | |
|---|---|---|---|
| 2003/0047829 A1 | 3/2003 | Gadkaree | |
| 2003/0053940 A1 | 3/2003 | Harada et al. | |
| 2003/0057581 A1 | 3/2003 | Lu et al. | |
| 2003/0148063 A1 | 8/2003 | Morimoto et al. | |
| 2004/0020846 A1 | 2/2004 | Ogunwumi et al. | |
| 2004/0055265 A1 | 3/2004 | Ohno et al. | |
| 2005/0143255 A1* | 6/2005 | Morimoto et al. | 502/178 |
| 2005/0221053 A1* | 10/2005 | Tomita et al. | 428/116 |
| 2005/0221974 A1* | 10/2005 | Tomita | 501/141 |
| 2006/0021310 A1 | 2/2006 | Ohno et al. | |
| 2008/0120950 A1 | 5/2008 | Ohno et al. | |
| 2010/0209310 A1 | 8/2010 | Ohno et al. | |

FOREIGN PATENT DOCUMENTS

| | | |
|---|---|---|
| JP | A 4-108676 | 4/1992 |
| JP | A 5-213681 | 8/1993 |
| JP | A 6-100381 | 4/1994 |
| JP | A 6-234567 | 8/1994 |
| JP | A 8-245279 | 9/1996 |
| JP | A 8-259344 | 10/1996 |
| JP | A 2000-109374 | 4/2000 |
| JP | A-2001-96116 | 4/2001 |
| JP | A 2002-219319 | 8/2002 |
| JP | A 2003-10617 | 1/2003 |
| JP | A 2003-146763 | 5/2003 |
| JP | A 2003-154224 | 5/2003 |
| JP | A 2003-292388 | 10/2003 |
| JP | A 2003-342076 | 12/2003 |
| WO | WO 02/085814 A2 | 10/2002 |
| WO | WO 03082771 A1 * | 10/2003 |
| WO | WO 2004/011124 A1 | 2/2004 |

OTHER PUBLICATIONS

European Search Report Application No. 05734731.2-2111 / 1739065 PCT/JP2005007605 dated Oct. 10, 2009.

Oct. 12, 2010 European Office Action issued in European Patent Application No. 05 734 731.2.

* cited by examiner

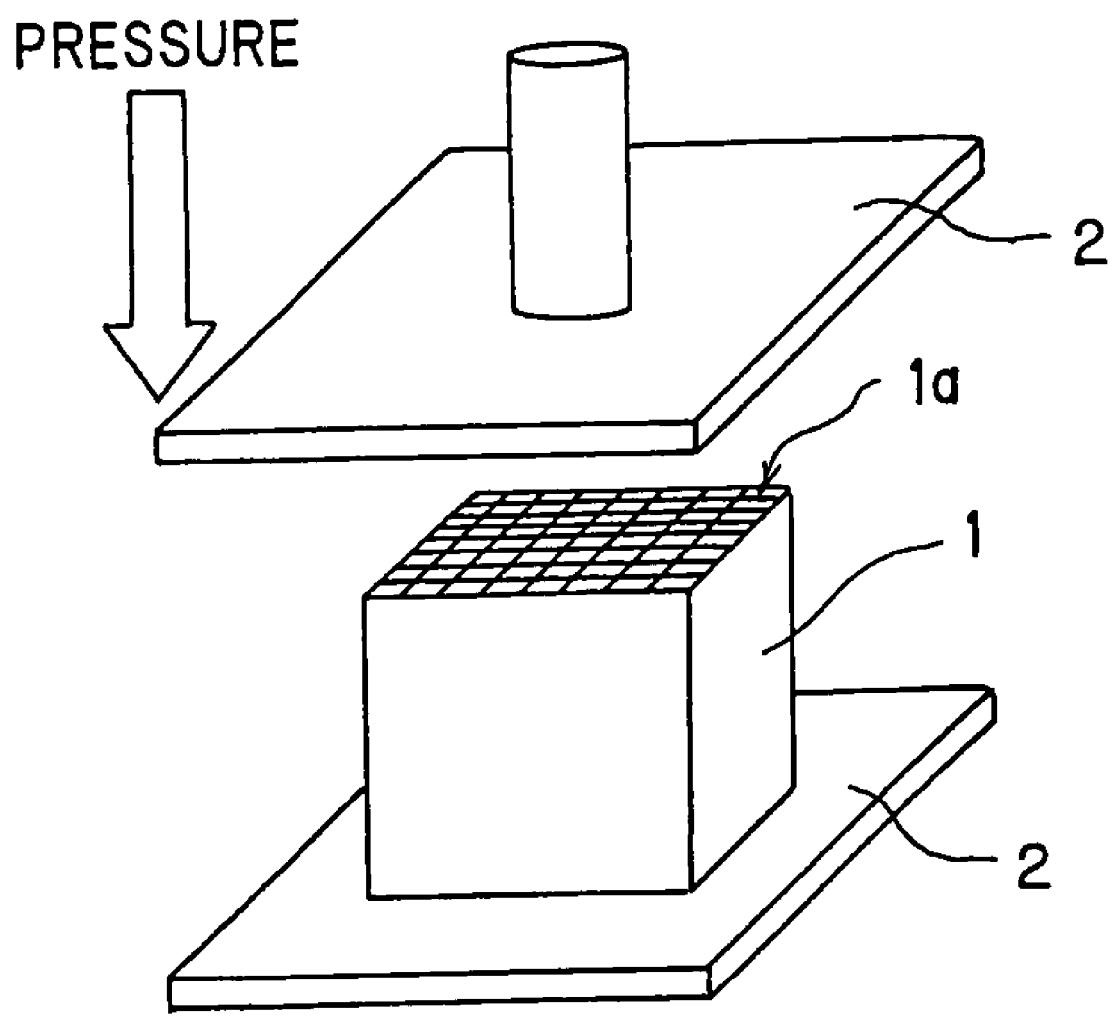

METHOD FOR PRODUCING POROUS HONEYCOMB STRUCTURE AND POROUS HONEYCOMB STRUCTURE

TECHNICAL FIELD

The present invention relates to a method for producing a porous honeycomb structural body and a porous honeycomb structural body obtained thereby. More particularly, the present invention relates to a method for producing a porous honeycomb structural body, which method enables to obtain a calcined body having less defects such as cracks or the like and high mechanical strength after calcining (binder removal), and also enables ultimately to obtain a porous honeycomb structural body having high porosity and high quality, and relates to the porous honeycomb structural body having high porosity and high quality obtained by this method.

BACKGROUND ART

A honeycomb structural body consisting of ceramics having excellent heat resistance and corrosion resistance is used in various industrial fields such as chemical, electric power, steel, industrial waste processing or the like as several kinds of separator (filter, for example) from the view point of environmental protection measurements, such as prevention of air pollution, prevention of global warming or the like. A porous honeycomb structural body is suitably used as a dust collection filter such as a diesel. particulate filter (DPF), which is used under high temperature and corrosive gas atmosphere for capturing the particulates exhausted from the diesel engines, for example.

Recently, a porous honeycomb structural body having low pressure loss and high porosity is especially requested among the above mentioned porous honeycomb structural body from necessity of improving the capacity of filter for dust collection. As the method for producing such a high porosity honeycomb structural body, for example, the method of producing the porous honeycomb structural body, which comprises kneading main constituent material, water, an organic binder (it is necessary to use an organic binder such as methyl cellulose or the like for improving plasticity, because the smooth extrusion to honeycomb shape is difficult if only the forming material is used because of insufficiency of plasticity and formability), a pore forming agent (an organic substance such as graphite or the like) or the like as a forming material, preparing a green body of improved plasticity, extruding shaping and drying the green body to manufacture a honeycomb formed body, and firing the honeycomb formed body to obtain a porous honeycomb structural body, is disclosed (for example, see Patent document 1). By using this kind of manufacturing method, it is possible to obtain a porous honeycomb structural body having high porosity, because pores are formed by destruction (burning out) of the organic binder and the pore forming agents at the time of firing of the honeycomb formed body.

Patent Document 1: JP-2002-219319

However, there is a problem which may cause to reduce the mechanical strength of the ultimate porous honeycomb structural body, because the obtained calcined body may have defects which were the space occupied by the organic binder at the time of calcining (binder removal) if the amount of addition of the organic binder is too much. Furthermore, the thermal stress between inner and outer part of the shaped body, which is produced by burning the organic binder at the time of calcining (binder removal) because of the inner part of the shaped body may have higher temperature than the outer part of the shaped body, may cause defects such as cracks or the like in the calcined body, especially if the bulk of the structural body is large.

The present invention has been made in view of the above problems and aims to provide a method for producing a porous honeycomb structural body, which method enables to obtain a calcined body having less defects such as cracks or the like and high mechanical strength after calcining (binder removal), and also enables ultimately to obtain a porous honeycomb structural body having high porosity and high quality, and also provide to the porous honeycomb structural body having high porosity and high quality obtained by this method.

DISCLOSURE OF THE INVENTION

In order to achieve the above aim, according to the present invention, the following method for producing a porous honeycomb structural body and a porous honeycomb structural body obtained thereby is provided.

[1] A method for producing a porous honeycomb structural body, which comprises preparing a green body by kneading a forming material containing a main constituent material consisting of non-oxide ceramics and/or a metal and an organic binder, manufacturing a honeycomb shaped formed body (honeycomb formed body) by shaping and drying said green body, calcining the honeycomb formed body to obtain a calcined body, and firing finally the calcined body to obtain a porous honeycomb structural body, wherein said forming material further includes 0.01-10 parts by mass of an inorganic layer material to 100 parts by mass of said main constituent material, in addition to said main constituent material and said organic binder.

[2] A method for producing a porous honeycomb structural body according to said [1], wherein smectite is used as said inorganic layer material.

[3] A method for producing a porous honeycomb structural body according to said [1] or [2], wherein alkaline ion type smectite, in which an interlayer cation is alkaline metal ion, is used as smectite.

[4] A method for producing a porous honeycomb structural body according to said [1] or [2], wherein alkaline earth metal ion type smectite, in which an interlayer cation is alkaline earth metal ion, is used as smectite.

[5] A method for producing a porous honeycomb structural body according to said [1], wherein hydrotalcite is used as said inorganic layer material.

[6] A method for producing a porous honeycomb structural body according to said [1], wherein talc is used as said layer material.

[7] A method for producing a porous honeycomb structural body according to any one of said [1] to [6], wherein said honeycomb formed body is calcined at 200-1000° C. to obtain said calcined body.

[8] A method for producing a porous honeycomb structural body according to any one of said [1] to [7], wherein said calcined body is fired at 1400-2400° C.

[9] A honeycomb structural body obtained by a method according to any one of said [1] to [8].

According to the present invention, it is provided a method for producing a porous honeycomb structural body, which method enables to obtain a calcined body having less defects such as cracks or the like and high mechanical strength after calcining (binder removal), and also enables ultimately to obtain a porous honeycomb structural body having high porosity and high quality, and also provided the porous honeycomb structural body having high porosity and high quality obtained by this method.

BRIEF DESCRIPTION OF THE DRAWINGS

FIG. 1 is an explanatory schematic view of an evaluation method of the calcined body obtained by the examples of the present invention and comparative examples.

REFERENCE NUMERALS

1: test piece, 1a: cell, 2: pressing plate.

BEST MODE FOR CARRYING OUT THE INVENTION

The best embodiment for carrying out the present invention is herein below described concretely.

A method for producing a porous honeycomb structural body of the present invention, which comprises preparing a green body by kneading a forming material containing a main constituent material consisting of non-oxide ceramics and/or a metal and an organic binder, manufacturing a honeycomb shaped formed body (honeycomb formed body) by shaping and drying said green body, calcining the honeycomb formed body to obtain a calcined body, and firing finally the calcined body to obtain a porous honeycomb structural body, characterized in that said forming material further includes 0.01-10 parts by mass of an inorganic layer material to 100 parts by mass of said main constituent material, in addition to said main constituent material and said organic binder.

In the present invention, said forming material used for manufacturing said honeycomb formed body further includes an inorganic layer material, in addition to said main constituent material consisting of non-oxide ceramics and/or a metal and said organic binder, and it is possible to enumerate water as a diffusion vehicle, diffusion agents, pore forming agents, surfactants, and the like as the other ingredients contained in the forming materials. Forming materials will be explained concretely by each constitution material as follows.

The main constitution materials contained in the forming material consists of non-oxide ceramics and/or metal, and will constitute the main constituent of the porous honeycomb structural body after the series of steps which comprises kneading as the main constituent of the forming material, preparing a green body, shaping into the honeycomb structural body, drying, then firing the honeycomb structural body. As the non-oxide ceramics and/or metal constituting the main constituent materials, it is possible to enumerate at least one kind of material selected from the group consisting of silicon carbide, silicon nitride, metal silicon, aluminum nitride and/or $Al_4SiC_4$. More concretely, it is possible to enumerate to constitute a porous honeycomb structural body consisting of silicon carbide or silicon nitride as the main constituent by using silicon carbide or silicon nitride as the single main constituent, and a porous honeycomb structural body consisting of Si-SiC sintered body by using silicon carbide and metal silicon as the main constituent materials.

The organic binder contained in the forming material has functions as the form keeping agent retaining the shape of the honeycomb structural body, as well as increasing plasticity and formability of the green body which is prepared by kneading the forming material. On the other hand, it is preferable that the amount of the organic binder should be controlled as little as possible in the forming material, by the reason that there is a problem which may cause to reduce the mechanical strength of the obtained calcined body, because the space occupied by the organic binder may cause the defects, or may occur the defects in the calcined body such as cracks or the like. From this reason, it is preferable in the present invention that the containing ratio of the organic binder is 10 parts by mass or less, more preferably 5 parts by mass or less, to 100 parts by mass of total amount of the main constituent material and the inorganic layer material. It is possible to use 0 parts by mass of the organic binder (i.e., the organic binder is not used at all) by a use.

As this kind of organic binder, it is possible to enumerate an organic polymer. More concretely, it is possible to enumerate hydroxypropoxyl methylcellulose, hydroxypropyl methylcellulose, methylcellulose, hydroxyl ethylcellulose, carboxyl methylcellulose, polyvinyl alcohol, and so on. The organic binder can be used single kind alone, or two or more kinds in combination.

In the present invention, as mentioned above, for preventing occurring cracks or the like in the calcined body, or for preventing reducing the mechanical strength thereof, a forming material in which inorganic layer materials, which has a function of sinterability and plasticity (formability), as mentioned bellow, is further contained is used, The "inorganic layer material" contained in the forming material, in the present invention, means the inorganic material having layer structure. Here, the "layer structure" means "the structure such as surfaces, in which atoms are filled thickly, are lined up in parallel each other by slightly weak bonding force (e.g., the van der Waals forces or the electrostatic forces provided by interlayer cation)" defined by "The Ceramic Dictionary" issued by Maruzen, Co. Ltd. in the year of 1986, for example.

As the inorganic "layer materials (mineral groups) used in the present invention, it is possible to enumerate, for example, pyrophyllite-talc (concretely, talc, interlayer cation: none), smectite (concretely, montmorillonite, hectorite, interlayer cation: Na, Ca), vermiculite (concretely, vermiculite, interlayer cation: Mg, (Na, K, Ca)), mica (concretely, muscovite, illite, interlayer cation: K, Na, Ca (Mg, Fe)), brittle mica (concretely, margarite, interlayer cation: Ca), hydrotalcite (concretely, hydrotalcite, interlayer cation: none). In this way, the inorganic stratified material used in the present invention mostly contains the elements (cations) such as sodium, calcium, potassium and so on.

In the present invention, the containing ratio of the inorganic layer materials is to be 0.01-10 parts by mass, preferably 1.0-5.0 parts by mass to 100 parts by mass of the main constituent material. If less than 0.01 parts by mass, it may cause cracks in the honeycomb formed body after calcining (binder removal), or may reduce the mechanical strength, and if more than 10 parts by mass, it may decrease the porosity caused by firing shrinkage of oxides at the time of firing. Additionally, the inorganic layer materials of the present invention can be used single kind alone, or two or more kinds in combination.

In the present invention, smectite is preferably used for the inorganic layer material from the view point of the cost and composition. Smectite means a group of clay minerals characterized in that which has a construction of one unit of sheet of an octahedral layer, consisting of aluminum (Al) or magnesium (Mg) and oxygen (O), which is sandwiched by a tetrahedral layer, consisting of silicon (Si) or aluminum (Al) and oxygen (O), by top and bottom, and ions of alkaline metal or alkaline earth metal are retained between the unit layer, and it contains the clay minerals such as montmorillonite, hectrite, saponite and the like. Incidentally, the clay, which includes much amount of montmorillonite, may be called as bentonite.

It is preferable to use the alkaline ion type smectite, in which the interlayer cation is alkaline ion, as smectite in the present invention, because it increases plasticity and formability of the green body.

It is preferable to use the alkaline earth metal type smectite, in which the interlayer cation is alkaline earth metal ion, as smectite in the present invention because it prevent evaporation of alkaline metal at the time of firing.

It is preferable to use hydrotalcite as the inorganic layer material in the present invention because it prevent evaporation of alkaline metal at the time of firing. Talc may be used. It can be expected that talc has the same effects as hydrotalcite.

It is possible to add the pore forming agent furthermore to the forming material to obtain the honeycomb structural body having high porosity. This kind of pore forming agent may act as a pore formation material, and it is possible to increase the porosity of the honeycomb structural body and to obtain the honeycomb structural body having high porosity by the pore forming agent which forms pores having desirable shape, size, distribution in the porous honeycomb structural body. As this kind of pore forming agent, it is possible to enumerate, for example, graphite, wheat flour, starch, phenolic resin, polymethylmethacrylate, polyethylene, polyethyleneterephtalate, or foaming resin (acrylonitrilic plastic balloon) or the like. These materials will be burnt out after forming pores. Above all, the foaming resin is preferable from the viewpoint of restraining the outbreak of $CO_2$ and harmful gas and also restraining the formation of the cracks in the honeycomb structural body. Furthermore, in case of using the pore forming agent, the containing ratio of the pore forming agents is preferable 50 parts by mass or less, further preferably 20 parts by mass or less, to 100 parts by mass of the forming material.

It is possible to add the diffusion vehicle furthermore to the forming materials in the present invention. As this kind of diffusion vehicle, it is possible to enumerate, for example, water, wax or the like. It is difficult to determine integrally the amount of the diffusion vehicle because it differs according to the forming material used, it is preferable to adjust the amount of the diffusion vehicle so that the green body has the appropriate hardness at the time of shaping.

In the present invention, the porous honeycomb structural body is obtained by preparing a green body by kneading a forming material, manufacturing a honeycomb shaped formed body (honeycomb formed body) by shaping and drying said green body, calcining the honeycomb formed body to obtain a calcined body, and firing the calcined body, and will be explained concretely by each step.

The method for preparing a green body by kneading a forming material is not limited especially, for example, it is possible to use a kneader, a vacuum pug mill or the like.

There is no particular limitation for the shape of honeycomb structural body, it is possible to indicate, for example, the body which has plurality of cells are formed penetrating between a pair of end faces by honeycomb shaped partition walls. For using the honeycomb structural body as a filter such as DPF or the like, it is preferable to plug the one end of the cell and another end of the adjacent cell alternatively. Also, there is no limitation for the outer configuration of the honeycomb structural body; it is possible to enumerate, for example, cylindrical, quadratic prism, triangular prism and the like. Furthermore, also there is no limitation for the configuration of cells (cell configuration in the cross section perpendicular to the direction of the cell formation) of the honeycomb structural body, it is possible to enumerate, for example, quadrangular, hexagonal, triangular or the like.

There is no particular limitation for shaping the honeycomb structural body, it is possible to use the traditionally known forming process such as extrusion forming, injection forming, and press forming and so on. Above all, it is possible to indicate the extrusion forming method by using the extrusion dies which has a desired sell configuration, wall thickness, cell density to extrude the prepared green body mentioned above, as the most preferable example. Also, there is no particular limitation for the method of drying, it is possible to use any traditionally known drying process such as hot air drying, microwave drying, dielectric drying, decompression drying, vacuum drying, freeze drying and so on. Above all, it is preferable to use the combination drying process of hot air drying and microwave drying, because it is possible to dry quickly and uniformly the shaped body as a whole.

In the present invention, the honeycomb formed body is calcined before the final firing. The "calcination" in the present invention means the operation which removes any kinds of organic materials (binder, diffusion agent, pore forming agent or the like) in the honeycomb formed body by combustion, it is called as the resin removal or the binder removal, too. The calcination temperature should be 200-1000° C. because the burning temperature of the organic binder is in the order of 100-300° C., and the burning temperature of the pore forming agent is in the order of 200-800° C., in general. The calcination time is in the order of 1-10 hours usually, even though there is no particular limitation.

Finally, the porous honeycomb structural body is obtained by firing (main firing or final firing) the calcined body obtained mentioned above. The "main firing" of the present invention means the operation which attains the predetermined mechanical strength by densifying through sintering the forming material of the calcined body. The firing conditions should be selected an appropriate condition according to the kinds of the forming material, by which the firing conditions differs, it is preferable to fire at 1400-1600° C. in case of obtaining the structural body having material consisting of silicon carbide and metal silicon, for example. The firing at 1400-1500° C. is further preferable. If lower than 1400° C., it may impossible to obtain the aimed fired body, and if higher than 1600° C., metal silicon may be evaporated and scattered. Firing time is preferably 1-10 hours.

The porous honeycomb structural body is obtained by the above mentioned method, and it is the porous honeycomb structural body having high porosity and high quality (high mechanical strength having less defects or cracks).

EXAMPLE

The present invention will be explained by examples below, but the present invention is not restricted at all by these examples.

Example 1

The compaction body of the green body is obtained by mixing and kneading the forming material which consists of 80 parts by mass of silicon carbide (SiC) having the average particle size of 47 μm and 20 parts by mass of silicon (Si) having the average particle size of 5 μm as the main constituent material, 1 parts by mass of montmorillonite which is one kind of smectite (sodium type montmorillonite) as the inorganic layer material, 5 parts by mass of methylcellulose as the organic binder, 15 parts by mass of starch and 10 parts by mass of foaming resin as the pore forming agent, 0.5 parts by mass of lauric acid potassium as the surfactant, and an appropriate amount of added water. Then a honeycomb formed body is obtained by extrusion shaping the green body to a honeycomb shape by the extruder through a dies so that cell construction has 12 mil/300 cpsi, and drying by combination of the hot air drying and microwave drying. Then obtained honeycomb formed body is calcined by 400° C., 5 hours to obtain the binder removed calcined body. There is no occurrence of cracks or the like in the obtained calcined body and the mechanical strength of the calcined body is 0.12 MPa. The honeycomb structural body is obtained by firing finally the obtained calcined body 1450° C., 2 hours under argon atmosphere. The porosity of the obtained porous honeycomb structural body is 58%.

Example 2

The same condition is employed with the Example 1, except to use 0.1 parts by mass of magnesium (Mg) substituted type montmorillonite, which is one kind of smectite (magnesium type smectite) instead of montmorillonite in the Example 1. There is no occurrence of cracks or the like in the obtained calcined body and the mechanical strength of the calcined body is 0.08 MPa. The honeycomb structural body is obtained by firing finally the obtained calcined body 1450° C., 2 hours under argon atmosphere. The porosity of the obtained porous honeycomb structural body is 59%.

Example 3

The same condition is employed with the Example 1, except to use 1.0 part by mass of hydrotalcite instead of montmorillonite in the Example 1. There is no occurrence of cracks or the like in the obtained calcined body and the mechanical strength of the calcined body is 0.10 MPa. The honeycomb structural body is obtained by firing finally the obtained calcined body 1450° C., 2 hours under argon atmosphere. The porosity of the obtained porous honeycomb structural body is 59%.

Example 4

The same condition is employed with the Example 1, except to use 1.0 part by mass of talc instead of montmorillonite in the Example 1. There is no occurrence of cracks or the like in the obtained calcined body and the mechanical strength of the calcined body is 0.08 MPa. The honeycomb structural body is obtained by firing finally the obtained calcined body 1450° C., 2 hours under argon atmosphere. The porosity of the obtained porous honeycomb structural body is 59%.

Example 5

The same condition is employed with the Example 1, except to use 0.01 parts by mass of montmorillonite to 100 parts by mass of the main constituent material as the containing ratio of the montmorillonite in the Example 1. There is no occurrence of cracks or the like in the obtained calcined body and the mechanical strength of the calcined body is 0.02 MPa. The honeycomb structural body is obtained by firing finally the obtained calcined body 1450° C., 2 hours under argon atmosphere. The porosity of the obtained porous honeycomb structural body is 60%.

Example 6

The same condition is employed with the Example 1, except to use 10 parts by mass of montmorillonite to 100 parts by mass of the main constituent material as the containing ratio of the montmorillonite in the Example 1. There is no occurrence of cracks or the like in the obtained calcined body and the mechanical strength of the calcined body is 0.22 MPa. The honeycomb structural body is obtained by firing finally the obtained calcined body 1450° C., 2 hours under argon atmosphere. The porosity of the obtained porous honeycomb structural body is 56%.

Example 7

The same condition is employed with the Example 2, except to use 0.01 parts by mass of magnesium substituted type montmorillonite to 100 parts by mass of the main constituent material as the containing ratio of the magnesium substituted type montmorillonite in the Example 2. There is no occurrence of cracks or the like in the obtained calcined body and the mechanical strength of the calcined body is 0.02 MPa. The honeycomb structural body is obtained by firing finally the obtained calcined body 1450° C., 2 hours under argon atmosphere. The porosity of the obtained porous honeycomb structural body is 60%.

Example 8

The same condition is employed with the Example 2, except to use 10 parts by mass of magnesium substituted type montmorillonite to 100 parts by mass of the main constituent material as the containing ratio of the magnesium substituted type montmorillonite in the Example 2. There is no occurrence of cracks or the like in the obtained calcined body and the mechanical strength of the calcined body is 0.17 MPa. The honeycomb structural body is obtained by firing finally the obtained calcined body 1450° C., 2 hours under argon atmosphere. The porosity of the obtained porous honeycomb structural body is 57%.

Example 9

The same condition is employed with the Example 3, except to use 0.01 parts by mass of hydrotalcite to 100 parts by mass of the main constituent material as the containing ratio of the hydrotalcite in the Example 3. There is no occurrence of cracks or the like in the obtained calcined body and the mechanical strength of the calcined body is 0.02 MPa. The honeycomb structural body is obtained by firing finally the obtained calcined body 1450° C., 2 hours under argon atmosphere. The porosity of the obtained porous honeycomb structural body is 61%.

Example 10

The same condition is employed with the Example 3, except to use 10 parts by mass of hydrotalcite to 100 parts by mass of the main constituent material as the containing ratio of the hydrotalcite in the Example 3. There is no occurrence of cracks or the like in the obtained calcined body and the mechanical strength of the calcined body is 0.16 MPa. The honeycomb structural body is obtained by firing finally the obtained calcined body 1450° C., 2 hours under argon atmosphere. The porosity of the obtained porous honeycomb structural body is 58%.

Example 11

The same condition is employed with the Example 4, except to use 0.01 parts by mass of talc to 100 parts by mass of the main constituent material as the containing ratio of the talc in the Example 4. There is no occurrence of cracks or the like in the obtained calcined body and the mechanical strength of the calcined body is 0.02 MPa. The honeycomb structural body is obtained by firing finally the obtained calcined body 1450° C., 2 hours under argon atmosphere. The porosity of the obtained porous honeycomb structural body is 60%.

Example 12

The same condition is employed with the Example 4, except to use 10 parts by mass of talc to 100 parts by mass of the main constituent material as the containing ratio of the talc in the Example 4. There is no occurrence of cracks or the like in the obtained calcined body and the mechanical strength of the calcined body is 0.16 MPa. The honeycomb structural body is obtained by firing finally the obtained calcined body 1450° C., 2 hours under argon atmosphere. The porosity of the obtained porous honeycomb structural body is 58%.

Comparative Example 1

The same condition is employed with the Example 1, except not to use the inorganic layer material in the Example 1. In the obtained calcined body, there is occurrence of cracks and the calcined body is collapsed. The honeycomb structural body which is obtained as pieces a part has porosity of 60%.

Comparative Example 2

The same condition is employed with the Example 1, except to use 15 parts by mass of montmorillonite to 100 parts by mass of the main constituent material as the containing ratio of the montmorillonite in the Example 1. There is no occurrence of cracks or the like in the obtained calcined body and the mechanical strength of the calcined body is 0.22 MPa. The honeycomb structural body is obtained by firing finally the obtained calcined body 1450° C., 2 hours under argon atmosphere. The porosity of the obtained porous honeycomb structural body is 45%.

Comparative Example 3

The same condition is employed with the Example 2, except to use 15 parts by mass of magnesium substituted type montmorillonite to 100 parts by mass of the main constituent material as the containing ratio of the magnesium substituted type montmorillonite in the Example 2. There is no occurrence of cracks or the like in the obtained calcined body and the mechanical strength of the calcined body is 0.18 MPa. The honeycomb structural body is obtained by firing finally the obtained calcined body 1450° C., 2 hours under argon atmosphere. The porosity of the obtained porous honeycomb structural body is 48%.

Comparative Example 4

The same condition is employed with the Example 3, except to use 15 parts by mass of hydrotalcite to 100 parts by mass of the main constituent material as the containing ratio of the hydrotalcite in the Example 3. There is no occurrence of cracks or the like in the obtained calcined body and the mechanical strength of the calcined body is 0.17 MPa. The honeycomb structural body is obtained by firing finally the obtained calcined body 1450° C., 2 hours under argon atmosphere. The porosity of the obtained porous honeycomb structural body is 50%.

Comparative Example 5

The same condition is employed with the Example 4, except to use 15 parts by mass of talc to 100 parts by mass of the main constituent material as the containing ratio of the talc in the Example 4. There is no occurrence of cracks or the like in the obtained calcined body and the mechanical strength of the calcined body is 0.17 MPa. The honeycomb structural body is obtained by firing finally the obtained calcined body 1450° C., 2 hours under argon atmosphere. The porosity of the obtained porous honeycomb structural body is 49%.

The main constituent material and the inorganic layer material used in the above mentioned Examples and the Comparative Examples, the mechanical strength of the obtained calcined body, the conditions of the calcined body, the porosity of the porous honeycomb structural body are shown in the Table 1 at the same time.

TABLE 1

| | Main constituent material (parts by mass) | Inorganic layer material | | | Mechanical strength of calcined body (MPa) | State of calcined body | Porosity of porous honeycomb structural body (%) |
|---|---|---|---|---|---|---|---|
| | | name | kind | amount (parts by mass) | | | |
| Example 1 | SiC/Si (80:20) | montmorillonite | Sodium type smectite | 1.0 | 0.12 | No cracks, no collapse | 58 |
| Example 2 | SiC/Si (80:20) | Magnesium substituted type montmorillonite | Magnesium type smectite | 1.0 | 0.08 | No cracks, no collapse | 59 |
| Example 3 | SiC/Si (80:20) | hydrotalcite | hydrotalcite | 1.0 | 0.10 | No cracks, no collapse | 59 |
| Example 4 | SiC/Si (80:20) | talc | talc | 1.0 | 0.08 | No cracks, no collapse | 59 |
| Example 5 | SiC/Si (80:20) | montmorillonite | Sodium type smectite | 0.01 | 0.02 | No cracks, no collapse | 60 |
| Example 6 | SiC/Si (80:20) | montmorillonite | Sodium type smectite | 10.0 | 0.22 | No cracks, no collapse | 56 |
| Example 7 | SiC/Si (80:20) | Magnesium substituted type montmorillonite | Magnesium type smectite | 0.01 | 0.02 | No cracks, no collapse | 60 |
| Example 8 | SiC/Si (80:20) | Magnesium substituted type montmorillonite | Magnesium type smectite | 10.0 | 0.17 | No cracks, no collapse | 57 |
| Example 9 | SiC/Si (80:20) | hydrotalcite | hydrotalcite | 0.01 | 0.02 | No cracks, no collapse | 61 |
| Example 10 | SiC/Si (80:20) | hydrotalcite | hydrotalcite | 10.0 | 0.16 | No cracks, no collapse | 58 |
| Example 11 | SiC/Si (80:20) | talc | talc | 0.01 | 0.02 | No cracks, no collapse | 60 |
| Example 12 | SiC/Si (80:20) | talc | talc | 10.0 | 0.16 | No cracks, no collapse | 58 |
| Comparative Example 1 | SiC/Si (80:20) | — | — | — | 0.005 | Collapsed | 60 |
| Comparative Example 2 | SiC/Si (80:20) | montmorillonite | Sodium type smectite | 15.0 | 0.22 | No cracks, no collapse | 45 |

TABLE 1-continued

| | Main constituent material (parts by mass) | Inorganic layer material | | amount (parts by mass) | Mechanical strength of calcined body (MPa) | State of calcined body | Porosity of porous honeycomb structural body (%) |
|---|---|---|---|---|---|---|---|
| | | name | kind | | | | |
| Comparative Example 3 | SiC/Si (80:20) | Magnesium substituted type montmorillonite | Magnesium type smectite | 15.0 | 0.18 | No cracks, no collapse | 48 |
| Comparative Example 4 | SiC/Si (80:20) | hydrotalcite | hydrotalcite | 15.0 | 0.17 | No cracks, no collapse | 50 |
| Comparative Example 5 | SiC/Si (80:20) | talc | talc | 15.0 | 0.17 | No cracks, no collapse | 49 |

Here, the mechanical strength, the state of the calcined body, the porosity of the porous honeycomb structural body obtained by the above mentioned Examples and the Comparative Examples are measured by the method mentioned below.

The mechanical strength of the calcined body: This is measured based on "The compression strength testing method for fine ceramics" specified in JIS R 1608. Concretely, the test pieces are manufactured by extruding the honeycomb structural cubes having same cell configuration, wall thickness, cell density and length of one side being 35 mm for each of the Example and the Comparative Example, drying, and calcining by same drying method and calcination method for each of the Example and the Comparative Example. Then the mechanical strength of the calcined body is calculated by pressing the test piece 1 to the cell 1 a forming direction by the pressing plate 2 as shown in FIG. 1, and measuring the compression strength. Here, the compression strength is calculated by dividing the maximum load by $35 \times 35(mm^2)$ considering the honeycomb cube being solid body.

The state of the calcined body: The presence of the cracks in the calcined body and the collapse by the self weight of the calcined body are observed with the naked eye.

The porosity of the porous honeycomb structural body: This is measured by the mercury porosimeter method.

As the result of the measurement, all the calcined bodies obtained by the Examples 1-12 have the mechanical strength of 0.02 MPa or more, as shown in the Table 1, it is not recognized any crack occurrences or collapses by self weight. Furthermore, the porous honeycomb structural bodies obtained by the Examples 1-12 keep the almost same level of porosity with the porous honeycomb structural body obtained by the Comparative Example 1, the porosity decrease is not recognized.

On the contrary, the calcined body obtained by the Comparative Example 1 can not prevent the collapse by self weight. On the other hand, even though all of the calcined bodies obtained by the Comparative Examples 2-5 have the mechanical strength of 0.17 MPa or more and it is not recognized the occurrence of cracks and the collapses by self weight, the porosity is decreased substantially as compared with the porous honeycomb body obtained by the Comparative Example 1. That is, it is not possible to obtain the porous honeycomb structural body having aimed high porosity (porosity 56% or more).

Industrial Applicability

The present invention is suitably used in various kind of separating apparatus and purifying apparatus preventing the environmental pollution and the global warming, in the fields of chemical, electric power, steel, industrial waste processing, or the like.

The invention claimed is:

1. A method for producing a porous honeycomb structural body, which comprises preparing a green body by kneading a forming material containing an organic binder and a main constituent material consisting of a non-oxide ceramic and/or a metal, manufacturing a honeycomb shaped formed body (honeycomb formed body) by shaping and drying said green body, calcining the honeycomb formed body to obtain a calcined body, and firing finally the calcined body to obtain the porous honeycomb structural body,
wherein said forming material further includes 0.01-10 parts by mass of an inorganic layer material to 100 parts by mass of said main constituent material, in addition to said main constituent material and said organic binder, and
at least one of smectite, or hydrotalcite mineral is used as the inorganic layer material.

2. A method for producing a porous honeycomb structural body according to claim 1, wherein an alkaline ion type smectite, in which the interlayer cation is alkaline metal ion, is used as the smectite.

3. A method for producing a porous honeycomb structural body according to claim 1, wherein an alkaline earth metal ion type smectite, in which the interlayer cation is alkaline earth metal ion, is used as the smectite.

4. A method for producing a porous honeycomb structural body according to claim 1, wherein said honeycomb formed body is calcined at 200-1000° C. to obtain said calcined body.

5. A method for producing a porous honeycomb structural body according to claim 1, wherein said calcined body is fired at 1400-2400° C.

6. A method for producing a porous honeycomb structural body according to claim 1, wherein the inorganic layer material has a layer structure that is bonded together by van der Waals forces or electrostatic forces provided by an interlayer cation.

7. A method for producing a porous honeycomb structural body according to claim 1, wherein the inorganic layer material used consists of hydrotalcite mineral.

8. The method for producing a porous honeycomb structural body according to claim 1, wherein the non-oxide ceramic and/or the metal is least one kind of material selected from the group consisting of silicon carbide, silicon nitride, metal silicon, aluminum nitride and $Al_4SiC_4$.

9. A honeycomb structural body obtained by a method according to claim 1.

10. A method for producing a porous honeycomb structural body, which comprises preparing a green body by kneading a forming material containing an organic binder and a main constituent material consisting of a non-oxide ceramic and/or a metal, manufacturing a honeycomb shaped formed body (honeycomb formed body) by shaping and drying said green body, calcining the honeycomb formed body to obtain a calcined body, and firing finally the calcined body to obtain the porous honeycomb structural body, wherein said forming material further includes 0.01-10 parts by mass of an inorganic layer material to 100 parts by mass of said main constituent material, in addition to said main constituent material and said organic binder, and smectite is used as the inorganic layer material.

11. A method for producing a porous honeycomb structural body according to claim 10, wherein an alkaline ion type smectite, in which the interlayer cation is alkaline metal ion, is used as the smectite.

12. A method for producing a porous honeycomb structural body according to claim 10, wherein an alkaline earth metal ion type smectite, in which the interlayer cation is alkaline earth metal ion, is used as the smectite.

13. A method for producing a porous honeycomb structural body according to claim 10, wherein said honeycomb formed body is calcined at 200-1000° C. to obtain said calcined body.

14. A method for producing a porous honeycomb structural body according to claim 10, wherein said calcined body is fired at 1400-2400° C.

15. A method for producing a porous honeycomb structural body according to claim 10, wherein the inorganic layer material has a layer structure that is bonded together by van der Waals forces or electrostatic forces provided by an interlayer cation.

16. The method for producing a porous honeycomb structural body according to claim 10, wherein the non-oxide ceramic and/or the metal is least one kind of material selected from the group consisting of silicon carbide, silicon nitride, metal silicon, aluminum nitride and $Al_4SiC_4$.

17. A honeycomb structural body obtained by a method according to claim 10.

18. A method for producing a porous honeycomb structural body, which comprises preparing a green body by kneading a forming material containing an organic binder and a main constituent material consisting of a non-oxide ceramic and/or a metal, manufacturing a honeycomb shaped formed body (honeycomb formed body) by shaping and drying said green body, calcining the honeycomb formed body to obtain a calcined body, and faring finally the calcined body to obtain the porous honeycomb structural body, wherein said forming material further includes 0.01-10 parts by mass of an inorganic layer material to 100 parts by mass of said main constituent material, in addition to said main constituent material and said organic binder, and hydrotalcite mineral is used as the inorganic layer material.

19. A method for producing a porous honeycomb structural body according to claim 18, wherein said honeycomb formed body is calcined at 200-1000° C. to obtain said calcined body.

20. A method for producing a porous honeycomb structural body according to claim 18, wherein said calcined body is fired at 1400-2400° C.

21. A method for producing a porous honeycomb structural body according to claim 18, wherein the inorganic layer material has a layer structure that is bonded together by van der Waals forces or electrostatic forces provided by an interlayer cation.

22. The method for producing a porous honeycomb structural body according to claim 18, wherein the non-oxide ceramic and/or the metal is least one kind of material selected from the group consisting of silicon carbide, silicon nitride, metal silicon, aluminum nitride and $Al_4SiC_4$.

23. A honeycomb structural body obtained by a method according to claim 18.

* * * * *